(12) United States Patent
Haga et al.

(10) Patent No.: US 11,727,023 B2
(45) Date of Patent: Aug. 15, 2023

(54) INFORMATION SEARCH AND DISPLAY SYSTEM

(71) Applicant: Woven by Toyota, Inc., Tokyo (JP)

(72) Inventors: Kouichiro Haga, Kashiwa (JP); Koji Haruta, Tokyo-to (JP); Hiroo Iida, Yokohama (JP); Masaaki Yamaoka, Tokyo-to (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 72 days.

(21) Appl. No.: 17/389,464

(22) Filed: Jul. 30, 2021

(65) Prior Publication Data

US 2022/0035803 A1 Feb. 3, 2022

(30) Foreign Application Priority Data

Jul. 31, 2020 (JP) ................................ 2020-130727

(51) Int. Cl.
*G06F 3/04812* (2022.01)
*G06F 3/04817* (2022.01)
*G06F 16/248* (2019.01)
*G06F 16/2457* (2019.01)

(52) U.S. Cl.
CPC ...... *G06F 16/248* (2019.01); *G06F 16/24578* (2019.01); *G06F 3/04812* (2013.01); *G06F 3/04817* (2013.01)

(58) Field of Classification Search
CPC ............. G06F 16/248; G06F 16/24578; G06F 3/04812; G06F 3/04817; G06F 3/0481
See application file for complete search history.

(56) References Cited

U.S. PATENT DOCUMENTS

| 9,207,832 B1 * | 12/2015 | Khouri ................... G06Q 10/10 |
| 10,459,938 B1 * | 10/2019 | Agnew ................. G06F 3/0482 |
| 10,902,462 B2 * | 1/2021 | Savage ............. G06Q 30/0244 |
| 11,055,359 B2 * | 7/2021 | Bak ....................... G06T 11/206 |

(Continued)

FOREIGN PATENT DOCUMENTS

| JP | 2010224941 A | 10/2010 |
| JP | 2015534185 A | 11/2015 |

(Continued)

*Primary Examiner* — Jorge A Casanova
(74) *Attorney, Agent, or Firm* — Dickinson Wright, PLLC

(57) ABSTRACT

An information search and display system searches for information in an organization and displaying it on a screen. The system includes a storage part storing correlation information showing correlation among information units including personnel and files in an organization and feature information showing features of the information units; a selecting part selecting information units with relevance to a search term based on the feature information if the search term is input; a correlation acquiring part acquiring a degree of correlation among the selected information units based on the correlation information; a generating part generating display data for displaying icons corresponding to the selected information units and connecting lines connecting these icons; and an output part outputting the generated display data. The generating part generates display data so that a display mode of a connecting line changes according to the degree of correlation.

10 Claims, 9 Drawing Sheets

(56) References Cited

U.S. PATENT DOCUMENTS

| | | | |
|---|---|---|---|
| 11,196,775 B1* | 12/2021 | Badawy | G06N 5/022 |
| 2003/0014428 A1* | 1/2003 | Mascarenhas | G06F 16/93 |
| 2006/0041476 A1* | 2/2006 | Zheng | G06Q 30/02 |
| | | | 705/14.66 |
| 2006/0184464 A1* | 8/2006 | Tseng | G06N 5/01 |
| | | | 707/E17.084 |
| 2009/0006622 A1* | 1/2009 | Doerr | G06Q 30/02 |
| | | | 709/225 |
| 2013/0226865 A1* | 8/2013 | Munemann | G06F 16/248 |
| | | | 707/723 |
| 2013/0257859 A1* | 10/2013 | Sato | G06T 19/00 |
| | | | 345/419 |
| 2014/0129552 A1* | 5/2014 | Sinha | G06Q 50/01 |
| | | | 707/732 |
| 2015/0081701 A1* | 3/2015 | Lerios | G06F 16/955 |
| | | | 707/736 |
| 2015/0286709 A1* | 10/2015 | Sathish | G06Q 10/06 |
| | | | 706/45 |
| 2016/0103932 A1* | 4/2016 | Sathish | G06F 3/04847 |
| | | | 715/767 |
| 2016/0132198 A1* | 5/2016 | Sinclair | G06Q 50/01 |
| | | | 715/739 |
| 2016/0147893 A1* | 5/2016 | Mashiach | G06F 16/9535 |
| | | | 707/710 |
| 2017/0161685 A1* | 6/2017 | Jennings | G06Q 30/0631 |
| 2017/0228561 A1* | 8/2017 | Nathan | G06F 16/2457 |
| 2017/0277691 A1* | 9/2017 | Agarwal | G06Q 50/01 |
| 2018/0013800 A1* | 1/2018 | Morrison | G06F 16/951 |
| 2018/0150571 A1* | 5/2018 | Douglas | H04L 51/52 |
| 2020/0412676 A1* | 12/2020 | Kau | H04L 12/1822 |
| 2021/0027231 A1* | 1/2021 | Ruble | G06Q 10/06393 |
| 2021/0209555 A1* | 7/2021 | Ramaswamy | G06F 9/4451 |
| 2021/0216937 A1* | 7/2021 | Dhaygude | G06Q 10/06393 |

FOREIGN PATENT DOCUMENTS

| | | |
|---|---|---|
| JP | 2017134847 A | 8/2017 |
| WO | 2014047683 A1 | 4/2014 |

* cited by examiner

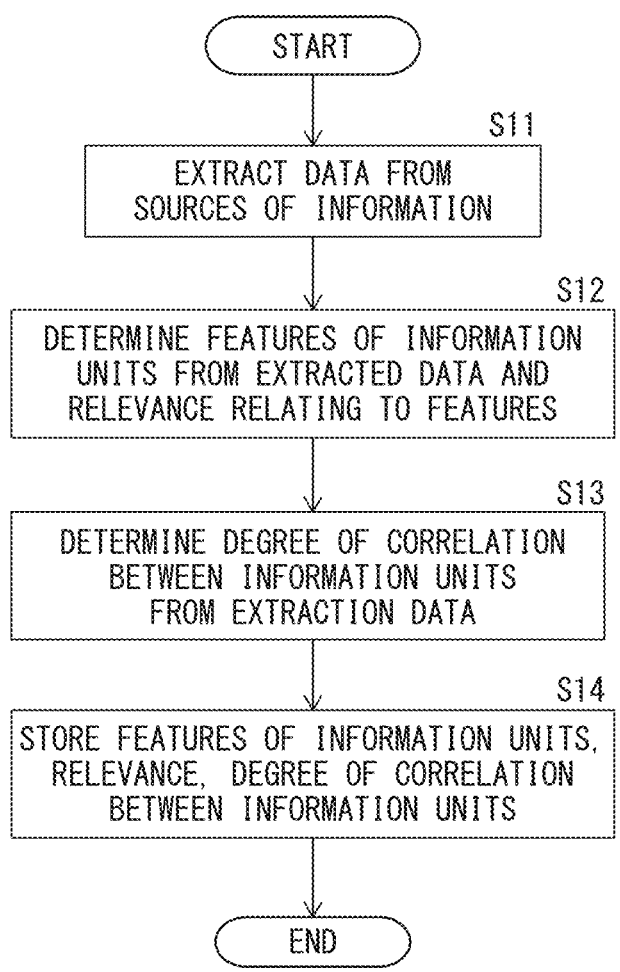

FIG. 5A

| ID | ID00001 |
|---|---|
| ATTRIBUTES | PERSONNEL |
| ACCESS | xxxx@xxx.xx |
| ICON | PHOTO DATA |
| ⋮ | ⋮ |

FIG. 5B

| KEYWORD | RELATION |
|---|---|
| AI | 10 |
| BIG DATA | 6 |
| DEVICE | 2 |
| TCP/IP | 8 |
| IOT | 7 |
| CONNECTED | 5 |
| ⋮ | ⋮ |

FIG. 5C

| ID | DEGREE OF CORRELATION |
|---|---|
| ID00002 | 10 |
| ID00003 | 6 |
| ⋮ | ⋮ |
| ID99999 | 7 |

FIG. 7

| INFORMATION UNIT | TYPE | RELEVANCE | | | DEGREE OF RELEVANCE | DEGREE OF CORRELATION | | | | | | | | TOTAL DEGREE OF CORRECTION | In |
|---|---|---|---|---|---|---|---|---|---|---|---|---|---|---|---|
| | | SEARCH TERM 1 | SEARCH TERM 2 | SEARCH TERM 3 | | A | B | C | D | E | F | G | H | | |
| A | PERSONNEL | 8 | 2 | 3 | 13 | | 19 | 78 | 12 | 11 | 21 | 7 | 18 | 166 | 5(5.11) |
| B | PERSONNEL | 5 | 7 | 0 | 12 | 19 | | 121 | 8 | 1 | 0 | 11 | 17 | 174 | 5(5.16) |
| C | PERSONNEL | 1 | 5 | 4 | 10 | 78 | 121 | | 31 | 15 | 27 | 3 | 28 | 303 | 6(5.71) |
| D | FILE | 6 | 3 | 3 | 12 | 12 | 8 | 31 | | 0 | 0 | 0 | 0 | 51 | 4(3.93) |
| E | FILE | 0 | 9 | 1 | 10 | 11 | 1 | 15 | 0 | | 0 | 0 | 0 | 27 | 3(3.29) |
| F | FILE | 2 | 2 | 4 | 8 | 21 | 0 | 27 | 0 | 0 | | 0 | 0 | 48 | 4(3.87) |
| G | FILE | 7 | 2 | 1 | 10 | 7 | 11 | 3 | 0 | 0 | 0 | | 0 | 21 | 3(3.04) |
| H | FILE | 4 | 1 | 8 | 13 | 18 | 17 | 28 | 0 | 0 | 0 | 0 | | 63 | 4(4.14) |

INFORMATION SEARCH AND DISPLAY SYSTEM

FIELD

The present disclosure relates to an information search and display system.

BACKGROUND

An information search and display system has been studied, which prepares a database relating to personnel in an organization, uses that database to search for information relating to specific personnel in the organization or search for personnel in the organization having specific features, and display the search results on a screen (for example, JP 2015-534185 A and JP 2010-224941 A).

For example, the information search and display system described in JP 2015-534185 A has a database prepared by acquiring features of personnel (knowledge, skills, experience, etc.) by making the personnel in the organization answer questionnaires, and a terminal enabling the database to be used to search for personnel in an organization having any features. According to this information search and display system, if a user executes a search relating to a feature on the terminal, personnel having the searched feature are displayed.

Further, in displaying the search results, it is studied to display an icon in which the search term is described, and thumbnail images of data of the search results around the icon (for example, JP 2017-134847 A). In particular, in JP 2017-134847 A, if there are a plurality of search terms, it is proposed to change the distance between the search terms corresponding to the degree of relevance between these search terms.

SUMMARY

In this regard, in the information search and display system described in Japanese JP 2015-534185 A, it is possible to search for personnel in an organization relating to any feature. However, for a user, sometimes the information of personnel in the organization is not sufficient.

In consideration of the above problem, an object of the present disclosure is to provide an information search and display system enabling information inside the organization to be suitably searched for and displayed.

The present disclosure has the following gist.

(1) An information search and display system searching for information in an organization and displaying it on a screen, the information search and display system comprising:

a storage part storing correlation information showing correlation among information units including personnel in an organization and files stored in a network of the organization and feature information showing features of the information units;

a selecting part selecting information units with relevance to a search term based on the feature information if the search term is input;

a correlation acquiring part acquiring a degree of correlation among the selected information units based on the correlation information;

a generating part generating display data for displaying icons corresponding to the selected information units and connecting lines connecting these icons; and an output part outputting the generated display data, wherein the generating part generates display data so that a display mode of a connecting line changes according to the degree of correlation.

(2) The information search and display system according to above (1), wherein the degree of correlation is higher, as the frequency of access between the information units or the number of times of access between the information units is greater.

(3) The information search and display system according to above (1) or (2), wherein when the information units are personnel in the organization, the degree of correlation is higher, as the frequency of contact or the number of times of contact between the personnel is greater.

(4) The information search and display system according to any one of above (1) to (3), wherein the generating part generates display data so that the higher the degree of correlation between information units, the greater the number of connecting lines connecting icons corresponding to these information units with each other.

(5) The information search and display system according to any one of above (1) to (3), wherein the generating part generates display data so that the higher the degree of correlation between information units, the thicker the connecting lines connecting icons corresponding to these information units with each other.

(6) The information search and display system according to any one of above (1) to (5), wherein the generating part generates display data so that the higher a total degree of correlation of an information unit with all other selected information units, the closer to the center the corresponding icon is arranged.

(7) The information search and display system according to any one of above (1) to (6), wherein the selecting part calculates a degree of relevance between an information unit and the search term based on the feature information and selects an information unit with relevance with the search term based on the degree of relevance, and the generating part generates display data so that the information unit with a high degree of relevance is displayed by a relatively large icon.

(8) The information search and display system according to any one of above (1) to (7), wherein the generating part generates display data so that the display mode of an icon corresponding to the information unit changes according to the type of the information unit.

(9) The information search and display system according to any one of above (1) to (8), wherein the generating part generates display data so that regardless of the type of the information unit, a message window is further displayed if an icon corresponding to the information unit is clicked or double clicked on or a pointer is superposed over an icon corresponding to an information unit.

(10) The information search and display system according to any one of above (1) to (9), wherein the storage part stores the correlation information and the feature information linked with sources of information from which these correlation information and feature information were extracted, the selecting part selects an information unit having relevance with a search term based on feature information extracted from a selected source of information, when a source of information covered by the search is selected by the user and the search term is input, and the correlation acquiring part acquires the degree of correlation among information units selected by the selecting part, based on correlation information extracted from the selected source of information.

(11) A program of a computer provided with a storage part and searching for information in an organization and displaying it on a screen, the information search and display program making the computer:

store correlation information showing correlation between information units including personnel in an organization and files stored in a network of the organization and feature information showing features of the information units;

select information units with relevance to a search term based on the feature information if the search term is input;

acquire a degree of correlation among the selected information units based on the correlation information;

generate display data displaying icons corresponding to the selected information units and connecting lines connecting these icons so that a display mode of a connecting line changes according to the degree of correlation; and output the generated display data,

BRIEF DESCRIPTION OF DRAWINGS

FIG. 4 is a flow chart showing one example of a flow of information storage processing.

FIGS. 5A-5C show one example of a feature and correlation table stored in a server storage part from a profiling part.

FIG. 7 is a table showing one example of a degree of relevance between search terms and information units, a degree of correlation between information units, etc., when three search terms are input.

DESCRIPTION OF EMBODIMENTS

Figure 1:
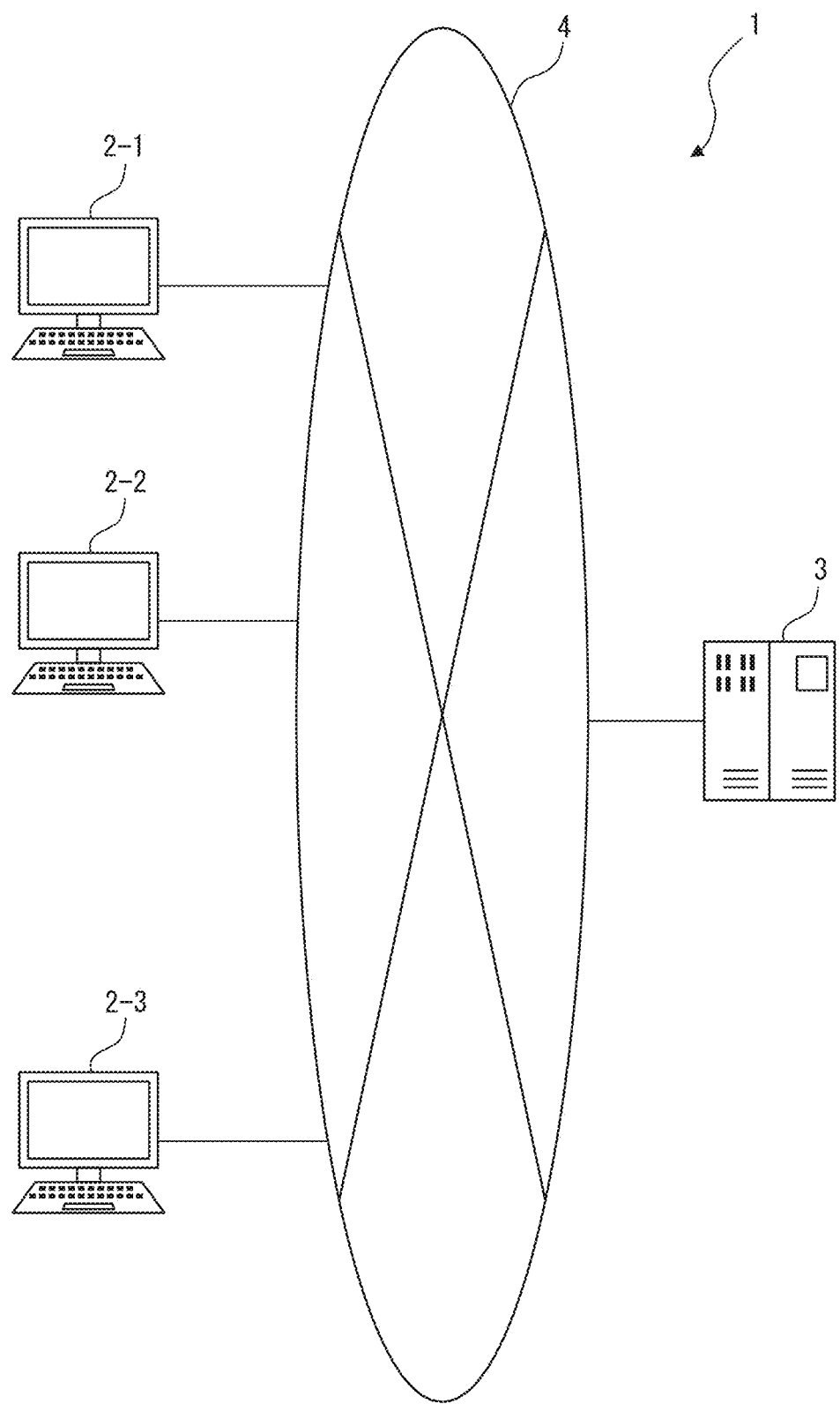
FIG. 1 is a view showing one example of the general configuration of an information search and display system according to one embodiment.

Below, embodiments will be explained in detail while referring to the drawings. Note that, in the following explanation, similar component elements are assigned the same reference notations.

Configuration of Information Search and Display System

FIG. 1 is a view showing one example of the general configuration of an information search and display system 1 according to one embodiment. The information search and display system 1 is used for searching for any information in an organization, and displaying it on the screen. The information search and display system 1 according to the present embodiment is, for example, used for searching for information on any personnel in the organization or information relating to information units including files stored in the network in the organization, and displaying it on the screen.

Note that, the term "organization" means any assembly for achieving any common objective and may be any of a profit, nonprofit, private, or public assembly. Therefore, the "organization", for example, includes a single company, a single government institution, a group of several companies, a group of several government institutions, and a group of companies and government institutions.

The information search and display system 1 includes a plurality of terminal devices 2-1 to 2-n and a server device 3. These terminal devices 2-1 to 2-n belong to an organization providing information search and display services. The terminal devices 2-1 to 2-n and the server device 3 are connected to be able to communicate with each other through a network 4. The terminal devices 2-1 to 2-n are terminals belonging to personnel in the organization. For example, they are PCs (personal computers) or tablets. The server device 3 is managed by the organization providing the information search and display services. In the illustrated example, the information search and display system 1 has a single server device 3, but it may also have a plurality of server devices 3. The network 4 is the Internet, an intranet, a LAN (local area network), etc. Note that, the server device 3 is one example of an information search and display system.

Figure 2:
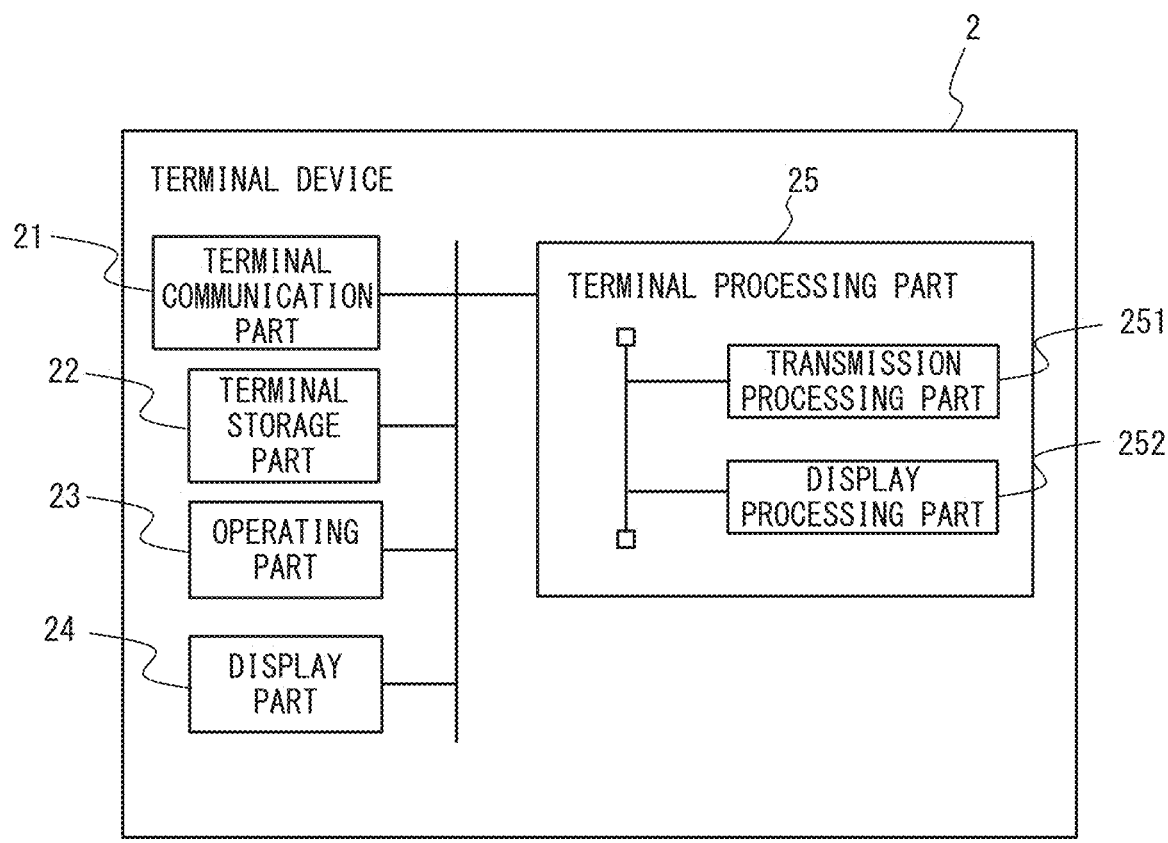
FIG. 2 is a view showing one example of the general configuration of a terminal device.

FIG. 2 is a view showing one example of the general configuration of a terminal device 2. The terminal device 2 includes a terminal communication part 21, terminal storage part 22, operating part 23, display part 24, and terminal processing part 25.

The terminal communication part 21 has a communication interface circuit enabling the terminal device 2 to communicate with the server device 3 through the network 4. The communication interface circuit provided at the terminal communication part 21 is a wired LAN, wireless LAN, or other communication interface circuit. The terminal communication part 21 transmits data supplied from the terminal processing part 25 to the server device 3, and supplies the data transmitted from the server device 3 to the terminal processing part 25.

The terminal storage part 22 is a device for storing programs or data. For example, it has a volatile semiconductor memory and nonvolatile semiconductor memory. The terminal storage part 22 stores an operating system program, driver programs, application programs, data, etc., used for processing by the terminal processing part 25. Further, the terminal storage part 22 may also store files, which form the later explained information units.

The operating part 23 is a device for receiving operations by the user on the terminal device 2 and, for example, is a mouse, keyboard, touch panel, etc. The operating part 23 receives input operations by the user. The input operations by the user include input operations of letters, numerals, symbols, etc., by the keyboard, click operations by the mouse and/or touch operations by touch panel. The operating part 23 generates signals corresponding to the operations when receiving operations by the user, and supplies them to the terminal processing part 25.

The display part 24 is a device for displaying an image, etc., to a user and, for example, is a liquid crystal display or organic EL display, etc. The display part 24 displays an image, etc., corresponding to the data supplied from the terminal processing part 25.

The terminal processing part 25 has one or more processors and their peripheral circuits. The terminal processing part 25 is for example a CPU (central processing unit) and comprehensively controls the operation of the terminal device 2. The terminal processing part 25 may be a DSP (digital signal processor), LSI (large scaled IC), ASIC (application specific IC), FPGA (field programmable gate array), etc. The terminal processing part 25 controls the operations of the terminal communication part 21 and the display part 24, based on the programs stored in the terminal storage part 22, so that various processing operations of the terminal device 2 are executed by suitable routines. The terminal processing part 25 executes the processing based on programs stored in the terminal storage part 22. The terminal processing part 25 can execute a plurality of programs in parallel.

The terminal processing part 25 has a transmission processing part 251 and the display processing part 252 as functional blocks. These parts are functional modules realized by programs executed by the terminal processing part 25. These parts may be loaded in the terminal device 2 as firmware.

Figure 3:
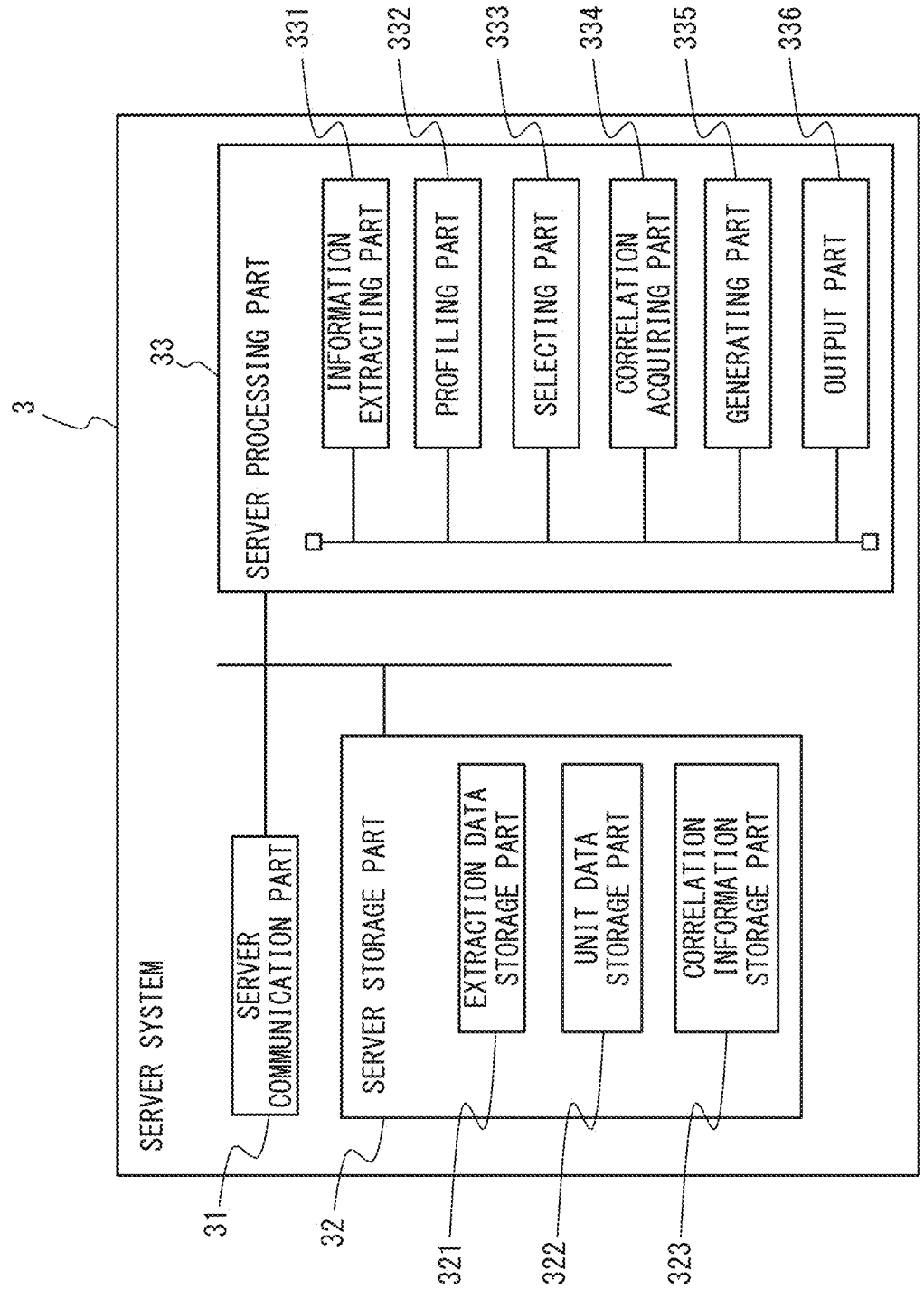
FIG. 3 is a view showing one example of the general configuration of a server device.

FIG. 3 is a view showing one example of the general configuration of the server device 3. The server device 3 is provided with a server communicating part 31, server storage part 32, and server processing part 33.

The server communicating part 31 is provided with a communication interface circuit enabling the server device 3 to communicate with the terminal device 2 through the network 4. The communication interface circuit which the server communicating part 31 is provided with is a communication interface circuit of a wired LAN, etc. The server communicating part 31 transmits data supplied from the server processing part 33 to the terminal device 2, and supplies the data transmitted from the terminal device 2 to the server processing part 33.

The server storage part 32 is a device for storing programs or data and, for example, has a volatile semiconductor memory and nonvolatile semiconductor memory. The server storage part 32 stores an operating system program, driver programs, application programs, data, etc., used for processing by the server processing part 33. The programs are, for example, installed from a CD-ROM, DVD-ROM, or other computer readable nontemporary portable storage medium, using a known setup program, etc., into the server storage part 32. Further, the server storage part 32 stores the later explained extraction data 321 and feature and correlation table 322 as data. In addition, the server storage part 32 stores files which form the later explained information units.

The server processing part 33 is provided with one or more processors and their peripheral circuits. The server processing part 33 is, for example, a CPU and comprehensively controls the operation of the server device 3. The server processing part 33 may also be a DSP, LSI, ASIC, FPGA, etc. The server processing part 33 controls the operation of the server communicating part 31 so that the various processings of the server device 3 are executed by suitable routines based on a program stored in the server storage part 32. The server processing part 33 executes the processing based on a program stored in the server storage part 32. Further, the server processing part 33 can execute a plurality of programs in parallel.

The server processing part 33 is provided with an information extracting part 331, profiling part 332, selecting part 333, correlation acquiring part 334, generating part 335, and output part 336 as functional blocks. These parts are functional modules realized by a program executed by the server processing part 33. These parts may also be mounted in the server device 3 as firmware.

Processing of Information Search and Display System

In the thus configured information search and display system 1, data relating to information units in the organization is extracted from various sources of information. In addition, in the information search and display system 1, based on the extracted data, feature information showing the features of the information units and correlation information showing the correlation between information units are determined. The determined feature information and correlation information are stored in the storage part. Below, the processing for storing the feature information and correlation information in the storage part based on the data extracted from the sources of information in this way will be called the "information storage processing".

Further, in the thus configured information search and display system 1, if a search term is input by a user operating a terminal device 2, the information units relating to the search term are displayed at the display part 24 of the terminal device 2. Below, the processing outputting display data for making the display part 24 display information units relating to the search term will be called the "search data display processing".

<Information Storage Processing>

First, the information storage processing executed by the information search and display system 1 will be explained. FIG. 4 is a flow chart showing one example of the flow of the information storage processing. In the present embodiment, the information storage processing is executed at the server processing part 33 of the server device 3.

In the information storage processing, first, the information extracting part 331 periodically extracts data from a large number of sources of information, and stores the extraction data 321 which is extracted at the server storage part 32 (step S11). In the present embodiment, the information extracting part 331 periodically extracts information relating to personnel in the organization and information relating to files stored in the server device in the organization, from a large number of types of sources of information. The information extracting part 331 converts various data structures in the sources of information (for example, HTML format) to a standard data structure suitable for storage in the server storage part 32 and suitable for analysis in the profiling part 332, and stores the extraction data 321 in the server storage part 32.

The information extracting part 331 extracts data from a terminal storage part 22 of a terminal device 2 in the organization, the server storage part 32 of the server device 3, and the server storage part of a server device outside the organization. The information extracting part 331 may also extract data from a terminal storage part 22 of a terminal device 2 in the organization. The data which the information extracting part 331 extracts includes, for example, text data, audio data, image data (still image data), and video data (moving picture data), etc.

In the information search and display system 1, it is necessary to obtain a grasp of personnel in the organization as information units. Therefore, the information extracting part 331 extracts the organization's personnel data including the personnel in the organization and their positions, etc. Specifically, the information extracting part 331, for example, periodically extracts from the server storage part 32 data of the application for managing the organization personnel data (for example, Pingboard®). Therefore, data of this application is one of the sources of information which the information extracting part 331 extracts information from.

Further, in the information search and display system 1, as information units, it is necessary to obtain a grasp of the files (text files, tabular calculation files, presentation files, PDF files, etc.) stored in the server storage part 32 of the server device 3 in the organization (and terminal storage part 22 of a terminal device 2 in the organization). Therefore, the information extracting part 331 extracts file data including the data of the files stored in the server storage part 32 of the server device 3 in the organization. Specifically, the information extracting part 331 periodically accesses the files stored in the server storage part 32 and extracts the data of these files. Therefore, the data of the files is one of the sources of information which the information extracting part 331 extracts information from.

Further, in the information search and display system 1, feature information of the information units and correlation information between information units are determined. Therefore, the information extracting part 331 extracts feature information of the information units and correlation information between information units.

The information extracting part 331, for example, periodically extracts access log data relating to personnel utilizing the terminal devices 2. The access log data is a log showing that personnel access in a file of the server device 3 in the organization or a website provided through the server device outside the organization, and is stored in a terminal storage part 22 of each terminal device 2 or the server storage part 32 of the server device 3. The information extracting part 331 extracts access log data linked with the accessing personnel. The access log data is one of the sources of information which the information extracting part 331 extracts information from.

The information extracting part 331, for example, periodically extracts data of text communication tools (e-mail, chat, etc.) stored in a server device in the organization or outside the organization. The data of the text communication tool is, for example, extracted together with the information of the sender of each message (personnel in the organization). The communication tool includes, for example, Gmail®, Slack®, Chatwork®, and other applications. The information extracting part 331 extracts data relating to feature information of information units and correlation information among information units, from the data of these text communication tools. The text communication tools constitute one of the sources of information which the information extracting part 331 extracts information from.

Further, the information extracting part 331, for example, periodically extracts data of the video conference tools. The data of the video conference tool is extracted as audio data or video data. Alternatively, the data of the video conference tool may be extracted as text data obtained by converting audio from audio data or video data to text. In addition, data of the video conference tool may include text data generated by converting words or graphs drawn on a whiteboard in a video conference to text. The information extracting part 331 may deduce the speaker himself and the emotions of the speaker from the audio data or video data, and extract data of the speaker and emotion data of the speaker in addition to the text data. The data of the video conference tool may be video data of conferences executed among a plurality of terminal devices 2 connected on-line, or text data, etc., extracted from that video data, and may be video data obtained by recording a conference held in a single conference room or text data extracted from that video data. Such video conference tools include, for example, Skype®, Webex®, Hangouts®, and various other applications. The information extracting part 331 extracts feature information of the information units and correlation information between the information units, from these text data, audio data, or video data. The video conference tools respectively are sources of information which the information extracting part 331 extracts information from.

Further, the information extracting part 331 may periodically extract the data used by tools other than the above, which are able to extract data relating to feature information of the information units and correlation information among information units. The other tools include, for example, groupware used in the organization (for example, G Suite®, Microsoft Outlook®, etc.), shared development tools (for example, GitHub®), etc. The information extracting part 331 extracts from these data the data relating to feature information of the information units and correlation information among the information units. The tools are respectively some of the sources of information from which the information extracting part 331 extracts information.

In the present embodiment, when extracting data from the various sources of information, the information extracting part 331 extracts it after cutting away unnecessary information by any scraping technique, and stores the extracted data in the server storage part 32. Therefore, the thus generated extraction data 321 becomes data of a size smaller than the original data. Further, the extraction data 321 is stored in the server storage part 32 in a state indexed for each data unit so that the profiling part 332 can quickly access the desired data. Further, the extraction data 321 may also be stored in the server storage part 32 linked with the sources of information from which the data was extracted.

At the information storage processing, next, the profiling part 332 determines the features of the information units and the relevances with the features, based on the extraction data 321 stored in the server storage part 32 (step S12). The profiling part 332, for example, determines the features of the information units and their relevance, by statistical analysis, text mining, image mining, audio mining, and other data analysis techniques.

The profiling part 332, for example, uses text mining to determine the frequency of appearance of words and sentences, the correlation of coappearances, etc., based on a web site viewed by certain personnel, contents of emails or chats sent by the personnel, statements in video conferences of the personnel, etc. Further, the profiling part 332 uses text mining to determine the frequency of appearance of words and sentences, the correlation of coappearances, etc., based on sentences contained in files stored in the server storage part 32, statements of personnel in emails or chats relating to the files, etc. Further, the profiling part 332 determines features of the information units (personnel or files) and relevance relating to the features, based on the frequency of appearance of words or sentences determined in above way. The profiling part 332, for example, designates keywords included in words or sentences with a high frequency or appearance or keywords relating to the words or sentences, as features of the information units. Further, the profiling part 332 calculates a relevance with features corresponding to keywords, depending on the frequency of appearance of words or sentences including the keywords or words or sentences relating to certain keywords. The profiling part 332 calculates the relevance based on that the higher the frequency of appearance of the word, the higher the relevance with the feature corresponding to the keywords.

Further, the profiling part 332 may, for example, also calculate the relevance based on the emotion data of personnel when a word or sentence relating to the keywords is issued. For example, the profiling part 332 calculates the relevance based on that personnel has a high relevance with the keywords if emotion data of the personnel when a word or sentence relating to the keywords is issued is positive.

In the information storage processing, next, the profiling part 332 determines the degree of correlation between the information units, based on the extraction data 321 stored in the server storage part 32 (step S13). The profiling part 332, for example, determines the degree of correlation between information units, by analysis of the access log in addition to the above-mentioned statistical analysis or other analytical techniques.

The profiling part 332 calculates the degree of correlation based on the closer the calculated features and relevance with the features between information units, the higher the degree of correlation among the information units. Further, the profiling part 332 calculates the degree of correlation, by analysis of the access logs, based on that the greater the frequency of access or the number of times of access among information units the higher the degree of correlation among the information units. The frequency of access and the number of times of access include the frequency or number of times of personnel, which constitutes information units, contacting each other by communication tools or the frequency or number of times of personnel, which constitutes information units, accessing files of information units, etc. Further, when the information units are personnel, the profiling part 332 calculates the degree of correlation, based on that the greater the frequency of contact or the number of times of contact among personnel, the higher the degree of correlation among the information units. The frequency of contact and the number of times of contact include the frequency and number of times of the personnel, which constitutes information units, attending the same conference or the frequency and number of times of them participating in the same video conference.

In the information storage processing, next, the profiling part 332 stores feature information of the information units (features and relevance with the features), and degree of correlation among information units, as the feature and correlation table 322, in the server storage part 32 (alternatively, updates a stored feature and correlation table 322) (step S14).

FIGS. 5A-5C show one example of a feature and correlation table 322 stored in the server storage part 32 from the profiling part 332. The example shown in FIG. 5 is an example of the feature and correlation table 322 regarding the features and correlation relating to one information unit (in the example shown in FIG. 5, personnel). The feature and correlation table 322 includes basic information relating to information units such as shown in FIG. 5A. The basic information relating to the information units includes IDs of the information units (any number not duplicated), attributes (attribute of being personnel or file), access destination (if personnel, contact information, if file, storage destination), information of icons used when displaying screen, etc. Further, the feature and correlation table 322, as shown in FIG. 5B, includes keywords relating to features of the information units and relevance (numerical values) relating to the keywords. In addition, the feature and correlation table 322, as shown in FIG. 5C, includes degree of correlation (numerical values) with all other information units. As a result, the server storage part 32 stores correlation information showing the correlation between the personnel in the organization and files stored in the network 4 of the organization (FIG. 5C) and feature information showing the features of information units (FIG. 5B).

Search Data Display Processing

Figure 6:
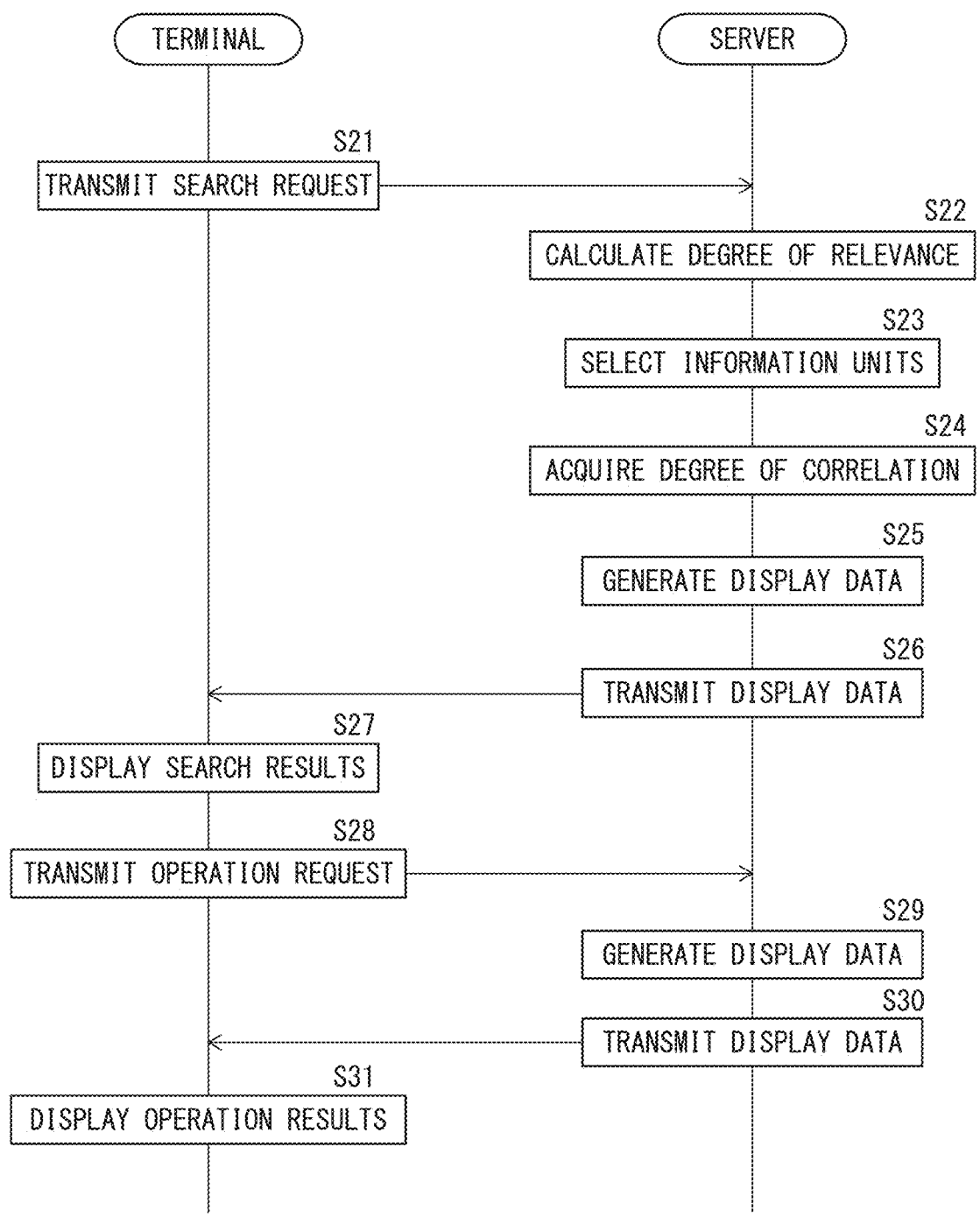
FIG. 6 is a sequence diagram showing one example of the flow of search data display processing.

Next, the search data display processing executed at the information search and display system 1 will be explained. FIG. 6 is a sequence diagram showing one example of the flow of search data display processing. In the present embodiment, the search data display processing is executed by the terminal processing part 25 of the terminal device 2 and the server processing part 33 of the server device 3.

First, in the search data display processing, first, the transmission processing part 251 of the terminal device 2 transmits a search request to the server device 3 (step S21). The transmission processing part 251, for example, displays an input screen at the display part 24 and receives input of one or more search terms. A search term is a term for which the user requires information relating to the information units in the organization. Therefore, for example, if a user desires to search for information units relating to the RNN technique (for example, personnel well versed with RNN, files containing information relating to RNN, etc.), the user inputs RNN as the search term. The transmission processing part 251 transmits a search request including the input search term to the server device 3.

Note that, a search request may contain search conditions as well. In this case, the transmission processing part 251 receives input of search conditions on the input screen displayed on the display part 24. The search conditions include, for example, the search range (for example, only personnel or only files etc.) and the like.

If the search request is transmitted from the terminal device 2, the selecting part 333 of the server device 3 calculates the degree of relevance of the received search term and the information units (step S22). The degree of relevance between the search term and the information units is calculated based on the feature and correlation table 322 stored in the server storage part 32, in particular based on the features of the information units and their relevance.

For example, if the search term matches with any one of the keywords in the feature and correlation table 322, the relevance with the keyword is calculated as the degree of relevance of the search term and the information units. Further, if the search term does not match with the keywords in the feature and correlation table 322, the relevance relating to one or more keywords with a high relevance with the search term is calculated as the degree of relevance of the search term and the information units.

In addition, if a plurality of search terms are input, the selecting part 333 calculates the relevance with the keywords matching or relating with each search term for each information unit, and calculates the degree of relevance of the search terms and information units based on the calculated relevance relating to all search terms calculated.

If the degree of relevance with the search term is calculated for each information unit, the selecting part 333 selects the information units with relevance with the search term, based on the calculated degrees of relevance (step S23). As explained above, the degree of relevance is calculated based on the feature information of the information units (in the present embodiment, the features of the information units and relevance relating to the features), therefore the selecting part 333 can be said to select information units with relevance with the search term based on the feature information.

Specifically, the selecting part 333, for example, selects a predetermined number of (for example, 10) information units having the highest degree of relevance calculated at step S22. Alternatively, the selecting part 333 may select information units relating to a predetermined number of (for example, five) personnel with high degrees of relevance and information units relating to a predetermined number of (for example, five) files with high degrees of relevance.

If information units with relevance with the search terms are selected, the correlation acquiring part 334 acquires the degree of correlation among the selected information units, based on the correlation information showing the correlation among the information units (step S24). In the present embodiment, the correlation acquiring part 334 acquires the degree of correlation among the selected information units from the feature and correlation table 322 stored in the server storage part 32.

If the information units are selected and the degrees of correlation between these information units are acquired, the generating part 335 generates display data of the search results for display on the display part 24 of the terminal device 2 (step S25). The generating part 335 of the present embodiment generates display data for displaying icons corresponding to the selected information units and the connecting lines connecting these icons. Below, referring to FIGS. 7 and 8, the search result display screen displayed on the display part 24 of the terminal device 2 based on the display data generated, will be explained.

FIG. 7 is a table showing the degree of relevance of search terms and information units (information units A to H) and the degree of correlation among information units, etc., when three search terms (search term 1, search term 2, and search term 3) are input. The examples shown in FIG. 7 show the case where a plurality of search terms are input. The relevance between the search terms and the information units is calculated. In addition, the total of the relevance with all search terms for the information units is calculated as the degree of relevance with all of the search terms input.

Further, in the examples shown in FIG. 7, the degrees of correlation among information units are acquired. In addition, the total of the degrees of correlation with all other information units for each information unit is calculated as the total degree of correlation. Further, the natural logarithm (number of significant digits) of the total degree of correlation calculated in this way is also calculated (at "In" column of FIG. 7, figures in parentheses show natural logarithms with three significant digits).

Figure 8:
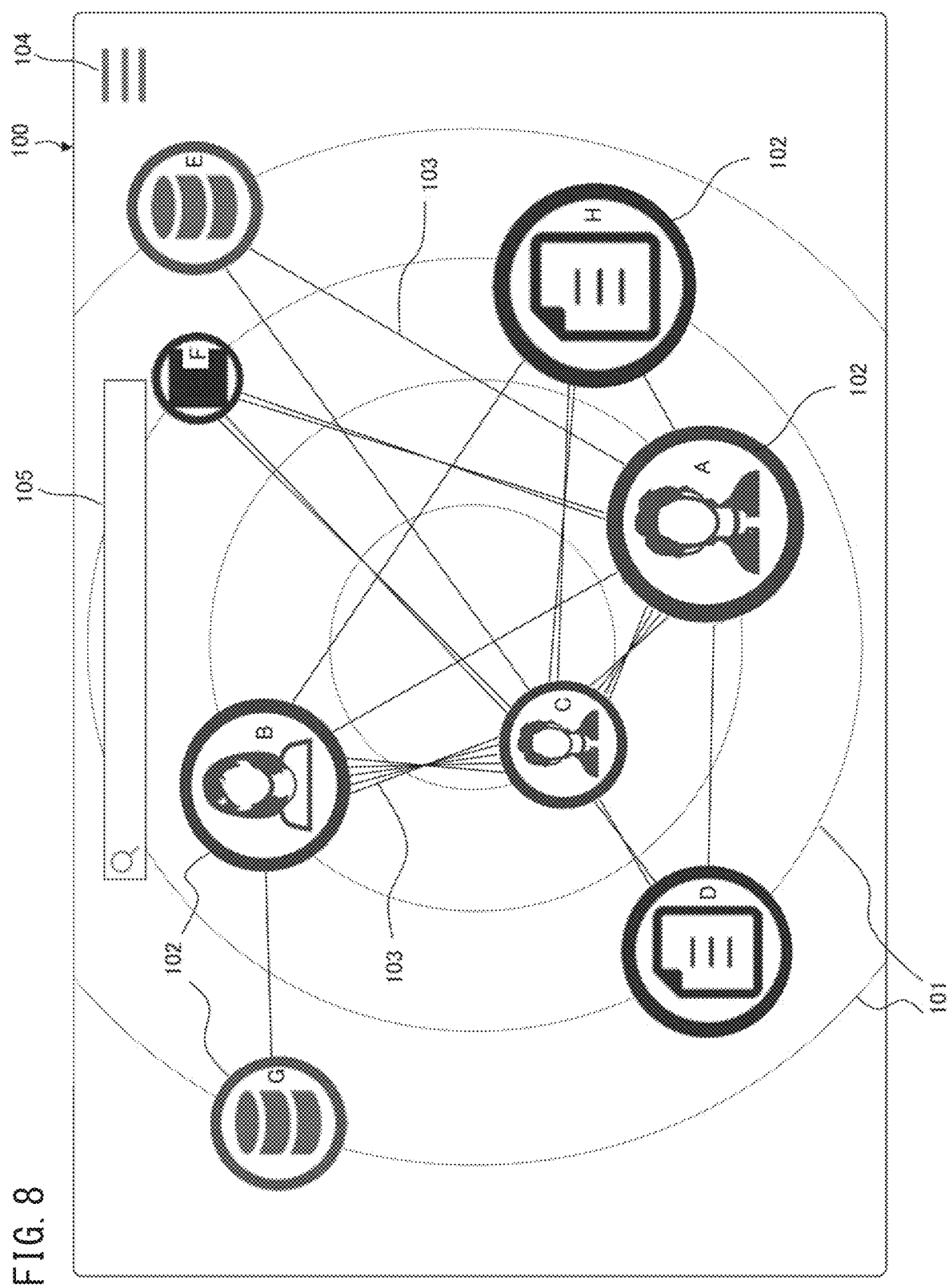
FIG. 8 is a view showing one example of a search result display screen displayed on a display part of a terminal device.

FIG. 8 is a view showing one example of a search result display screen 100 displayed at a display part 24 of the terminal device 2, based on display data of the generated search results. In particular, FIG. 8 shows the search result display screen 100 prepared based on the table shown in FIG. 7.

As shown in FIG. 8, the search result display screen 100 includes circular lines 101, unit icons 102 corresponding to the information units, connecting lines 103 connecting these unit icon 102, "favorite" icons 104, and a search window 105 for inputting search terms.

A plurality of circular lines 101 are displayed concentrically at the search result display screen 100. The center of the circular lines 101 is the center of the search result display screen 100. The circular lines 101 are displayed as thin fine lines so as not to stand out. Note that, the circular lines 101 need not be displayed at the search result display screen 100.

The unit icons 102 corresponding to the information units change in display modes in accordance with the types of the corresponding information units. For example, when the type of the information units is personnel, the unit icons 102 corresponding to the information units are icons containing photos of the personnel or icons containing illustrations of personnel. Further, when the type of the information units is a file, the unit icons 102 corresponding to the information units are icons including illustrations of files, etc. In this case, as the unit icons 102, icons of illustrations different for each type of file may also be used. Further, the colors of the unit icons 102 as a whole or the frames of the unit icons 102 may differ according to the types of the information units.

Further, the unit icons 102 change in display mode in accordance with the degrees of relevance with the search term of the corresponding information units. For example, the unit icons 102 corresponding to information units with relatively high degrees of relevance are displayed relatively large. Therefore, in the example shown in FIG. 8, information units H with high degrees of relevance with the search term are displayed the largest. Alternatively, the colors of the frames of the unit icons 102 corresponding to the information units with relatively high degrees of relevance are displayed relatively darkly.

In addition, in the present embodiment, the higher the total degree of correlation of the information units with respect to all other selected information units among the selected information units, the closer to the center side the corresponding unit icons 102 are arranged. In the present embodiment, the search result display screen 100 displays four circular lines 101, and the unit icons 102 corresponding to information units with high total degrees of correlation are arranged on the center circular line 101, while the unit icons 102 corresponding to the information units with low total degrees of correlation are arranged on the outside circular line 101. In the example shown in FIGS. 7 and 8, information units C with values of the natural logarithm of the total degree of correlation of 6 are arranged on the inside-most circular line 101, and information units E, G with values of the natural logarithm of the total degree of correlation of 3 are arranged on the outside most circular line 101.

The connecting lines 103 change in display mode in accordance with the degree of correlation between information units corresponding to the unit icons 102 which the connecting lines 103 connect. Specifically, in the present embodiment, the higher the degree of correlation between information units, the greater the number of connecting lines 103 connecting the unit icons 102 corresponding to these information units.

In the example shown in FIGS. 7 and 8, the number of connecting lines 103 connecting the unit icons 102 of the information unit B and information unit C with the highest degree of correlation is the greatest. On the other hand, in the example shown in FIGS. 7 and 8, there is a single connecting line 103 connecting the unit icons of the information units with small values of degrees of correlation of 10 to 20. Further, no connecting line is displayed between unit icons of information units with values of degrees of correlation of less than 10.

Note that, in the present embodiment, the number of connecting lines 103 connecting the unit icons 102 change corresponding to the degrees of correlation. However, it is also possible to change to another display mode in accordance with the degree of correlation. Therefore, for example, the higher the degrees of correlation between information units, the thicker the connecting lines 103 connecting the unit icons 102 corresponding to these information units may be made.

If the generating part 335 generates display data of the search results, the output part 336 transmits the display data of the generated search results through the server communicating part 31 to the terminal device 2 (step S26). Note that, sending the display data of the search results to the terminal device 2 is one example of the output part 336 outputting the display data of the search results.

The display processing part 252 of the terminal device 2 displays the search results on the display part 24, based on the transmitted display data of the search results (step S27). As a result, the display part 24 displays a search result display screen 100 such as shown in FIG. 8.

After that, if the user operates the terminal device 2 on the search result display screen 100 displayed on the display part 24, the transmission processing part 251 transmits the operation request to the server device 3 (step S28). The transmission processing part 251, for example, receives the operation of the pointer being superposed on the unit icon 102 displayed on the display part 24. Further, the transmission processing part 251, for example, receives the operation of clicking or double clicking the unit icon 102 displayed on the display part 24 or the "favorite" icon 104. The transmission processing part 251 transmits an operation request accompanying a received operation to the server device 3.

If the operation request is transmitted to the server device 3, the generating part 335 generates display data of the operation result for display at the display part 24 of the terminal device 2 according to the operation request (step S29). For example, if the operation received at the terminal device 2 is an operation of superposing the pointer on one unit icon 102, regardless of the type of the unit icon 102, the generating part 335 generates the display data so that a message input window is displayed on the unit icon 102 over which the pointer is superposed. At such a message input window, for example, a question relating to the information unit corresponding to the unit icon 102 is input by the user. The server device 3 prepares a response to the question based on the keyword relating to the information unit, and the generating part 335 generates display data including that response.

Figure 9:
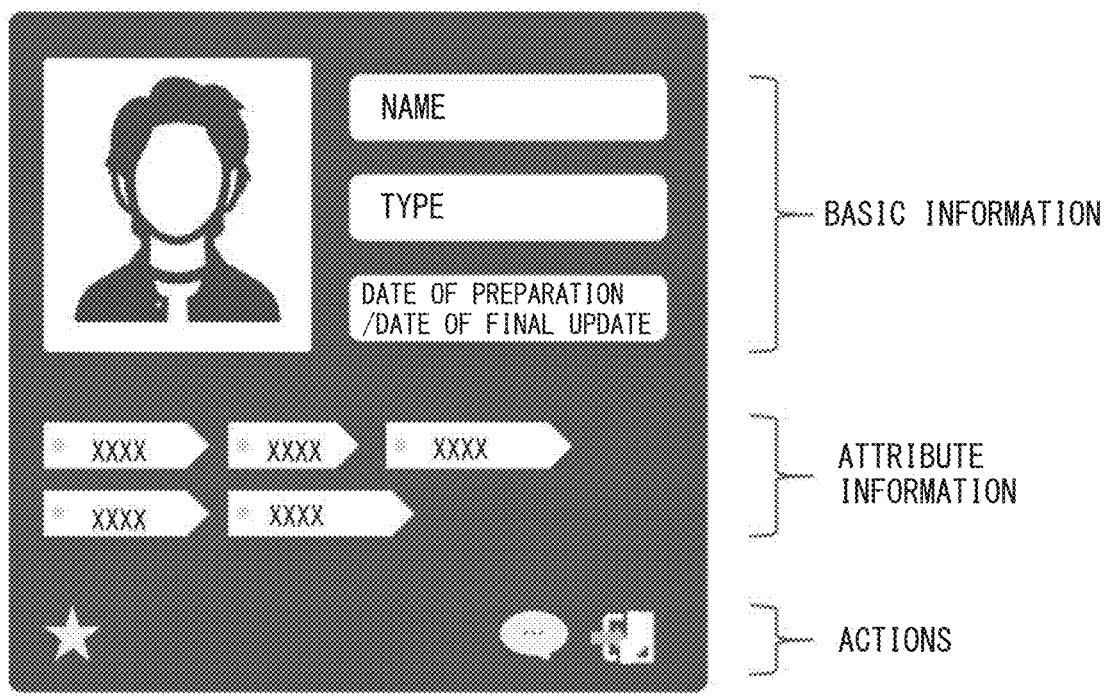
FIG. 9 is a view showing one example of an information window relating to one information unit.

Further, for example, if the operation received at the terminal device 2 is an operation clicking or double clicking on one unit icon 102, the generating part 335 generates display data so as to display an information window such as shown in FIG. 9 on or near the clicked or double clicked unit icon 102. The information window includes information relating to the information units corresponding to the clicked or double clicked unit icon 102. Specifically, the information window, for example, includes the name or type or other basic information of the information unit and attribute information of the information unit (for example, keyword with high relevance with the information unit). In the example shown in FIG. 9, the information window further includes an action button for executing some sort of operation.

Note that, in the present embodiment, if the pointer is superposed on the unit icon 102, a message input window is displayed. If the unit icon 102 is clicked or double clicked on, the information window is displayed. However, the reverse operations may also be executed by these operations. Therefore, the message input window may also be displayed if a unit icon 102 is clicked or double clicked on.

In addition, for example, if the operation received at the terminal device 2 is an operation for clicking or double clicking on the "favorite" icon 104, the generating part 335 generates display data so as to display a favorites window below the "favorite" icon 104. The favorites window, for example, as shown in FIG. 10, displays rows of information units recorded as favorites by the user.

After the generating part 335 generates display data of the operation results, the output part 336 transmits display data of the operation results generated to the terminal device 2 through the server communicating part 31 (step S30). The display processing part 252 of the terminal device 2 displays the operation results on the display part 24, based on the display data of the transmitted operation results (step S31).

Figure 10:
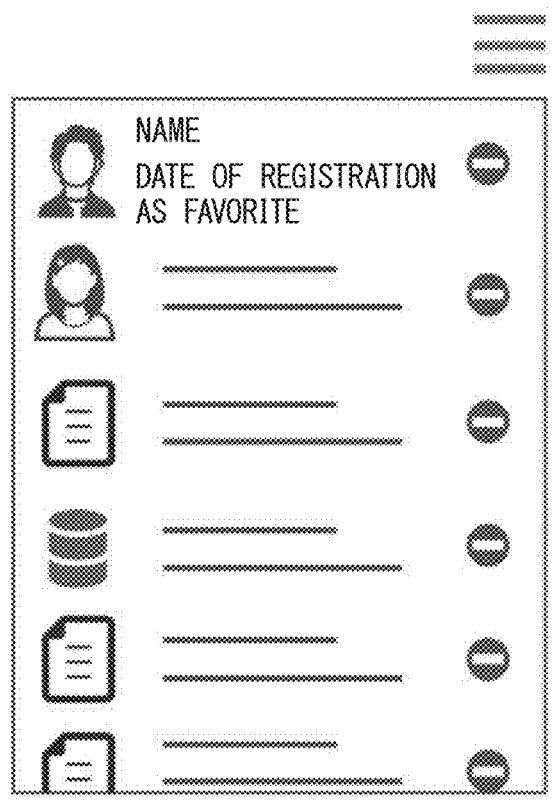
FIG. 10 is a view showing one example of a favorites window.

As a result, the display part 24 displays a display screen, on which an information window shown in FIG. 9 or a favorites window shown FIG. 10 is superposed, on a search result display screen 100 such as shown in FIG. 8.

Effects and Modifications

As explained above, in the information search and display system 1 according to the above embodiment, the server device 3 generates display data for displaying icons corresponding to personnel in the organization and icons corresponding to files stored in the network of the organization on a single screen. Further, the server device 3 generates display data so that the connecting lines connecting these icons change in display mode corresponding to the degree of correlation. As a result, the user can easily access personnel very familiar with information required by the user or files in which information required by the user is disclosed.

Further, the server device 3 changes the display mode of the connecting lines based on the frequency of access, the frequency of contact, etc., among information units. As a result, the user, for example, can easily access personnel very familiar with the content of the file. Furthermore, the server device 3 changes the number or thickness of the connecting lines connecting the unit icons in accordance with the degree of correlation. As a result, the user can obtain a visual grasp of the degrees of relevance among information units corresponding to the unit icons.

In addition, the server device 3 generates display data so that the higher the total degree of relevance with all other information units among the information units, the closer to the center the corresponding icons are arranged. As a result, the user can visually grasp the personnel or file which is the key to the information which the user requires.

Above, preferred embodiments according to the present invention were explained, but the present invention is not limited to these embodiments and can be modified or changed in various ways within the language of the claims.

For example, in the above embodiment, the generating part 335 and output part 336 are provided as functional blocks at the server processing part 33 of the server device 3. However, these parts may also be provided as functional blocks at the terminal processing part 25 of the terminal device 2. In this case, information on the degree of relevance and the degree of correlation with the search term determined in the server processing part 33 (information such as shown in the table of FIG. 7) is transmitted from the server processing part 33 through the server communicating part 31 to the terminal processing part 25.

Further, in the above embodiment, the profiling part 332 determines the feature information of the information units and the correlation information between the information units, based on the data extracted from all the sources of information. However, the profiling part 332 may also determine the feature information of the information units and the correlation information between the information units, based on the data extracted from some of the sources of information, and store the determined feature information and correlation information linked with the sources of information from which these information were extracted. In this case, the server storage part 32 stores the feature information of the information units and the correlation information between the information units for each combination of the sources of information.

In this case, the transmission processing part 251 receives the input of the sources of information covered by the search as search conditions, in addition to input of the search term.

The input of sources of information covered by the search may, for example, be executed by the user selecting sources of information desired to be covered by the search among all of the sources of information, or may be executed by the user selecting sources of information not desired to be covered by the search among all of the sources of information. The types of the sources of information to be covered by the search are included in the search request transmitted from the transmission processing part 251 to the server device 3.

If the sources of information to be covered by the search are input in this way, the selecting part 333 of the server device 3 calculates the degrees of relevance of the search term and information units, based on the correlation information of the information units determined based on the data extracted from the sources of information to be covered by the search. Further, the selecting part 333 selects information units related with the search term based on the degrees of relevance calculated in the above way. In addition, the correlation acquiring part 334 acquires the degrees of correlation between selected information units, based on the correlation information between the information units determined based on the data extracted from the sources of information to be covered by the search. The generating part 335 displays the icons corresponding to the thus selected information units and connecting lines connecting these icons, and generates display data so that the display mode of the connecting lines changes corresponding to the degrees of correlation.

As a result, information units relating to the search term are selected based on only information of the desired sources of information. Further, the display mode of the connecting line becomes a display mode corresponding to the degree of correlation determined based on only the information of the desired sources of information. Therefore, a user can exclude information from sources of information considered to contain large amounts of information not related with the information which is required by the user, and accordingly can find personnel more familiar with the information which is required by the user and files which is required by the user, at a higher precision.

The invention claimed is:

1. An information search and display system searching for information in an organization and displaying it on a screen, the information search and display system comprising:
   a memory storing correlation information showing correlation among information units including personnel in an organization and files stored in a network of the organization and feature information showing features of the information units; and
   a processor, wherein
   the processor is configured to:
   select information units with relevance to a search term based on the feature information if the search term is input;
   acquire a degree of correlation among the selected information units based on the correlation information;
   generate display data for displaying icons corresponding to the selected information units and connecting lines connecting these icons; and
   output the generated display data, and
   the processor is configured to generate display data so that a display mode of a connecting line changes according to the degree of correlation; wherein
   the processor is configured to calculate a degree of relevance between an information unit and the search term based on the feature information and select an information unit with relevance with the search term based on the degree of relevance, and
   the processor is configured to generate display data so that the information unit with a high degree of relevance is displayed by a relatively large icon.

2. The information search and display system according to claim 1, wherein the degree of correlation is higher, as the frequency of access between the information units or the number of times of access between the information units is greater.

3. The information search and display system according to claim 1, wherein when the information units are personnel in the organization, the degree of correlation is higher, as the frequency of contact or the number of times of contact between the personnel is greater.

4. The information search and display system according to claim 1, wherein the processor is configured to generate display data so that the higher the degree of correlation between information units, the greater the number of connecting lines connecting icons corresponding to these information units with each other.

5. The information search and display system according to claim 1, wherein the processor is configured to generate display data so that the higher the degree of correlation between information units, the thicker the connecting lines connecting icons corresponding to these information units with each other.

6. The information search and display system according to claim 1, wherein the processor is configured to generate display data so that the higher a total degree of correlation of an information unit with all other selected information units, the closer to the center the corresponding icon is arranged.

7. The information search and display system according to claim 1, wherein the processor is configured to generate display data so that the display mode of an icon corresponding to the information unit changes according to the type of the information unit.

8. An information search and display system searching for information in an organization and displaying it on a screen, the information search and display system comprising:
   a memory storing correlation information showing correlation among information units including personnel in an organization and files stored in a network of the organization and feature information showing features of the information units; and
   a processor, wherein
   the processor is configured to:
   select information units with relevance to a search term based on the feature information if the search term is input;
   acquire a degree of correlation among the selected information units based on the correlation information;
   generate display data for displaying icons corresponding to the selected information units and connecting lines connecting these icons; and
   output the generated display data, and
   the processor is configured to generate display data so that a display mode of a connecting line changes according to the degree of correlation;
   wherein the processor is configured to generate display data so that regardless of the type of the information unit, a message window is further displayed if an icon corresponding to the information unit is clicked or double clicked on or a pointer is superposed over an icon corresponding to an information unit.

9. An information search and display system searching for information in an organization and displaying it on a screen, the information search and display system comprising:
- a memory storing correlation information showing correlation among information units including personnel in an organization and files stored in a network of the organization and feature information showing features of the information units; and
- a processor, wherein the processor is configured to:
- select information units with relevance to a search term based on the feature information if the search term is input;
- acquire a degree of correlation among the selected information units based on the correlation information;
- generate display data for displaying icons corresponding to the selected information units and connecting lines connecting these icons; and
- output the generated display data, and the processor is configured to generate display data so that a display mode of a connecting line changes according to the degree of correlation;

the memory stores the correlation information and the feature information linked with sources of information from which these correlation information and feature information were extracted, the processor is configured to select an information unit having relevance with a search term based on feature information extracted from a selected source of information, when a source of information covered by the search is selected by the user and the search term is input, and the processor is configured to acquire the degree of correlation among information units selected by the selecting part, based on correlation information extracted from the selected source of information.

10. A non-transitory computer readable medium having recorded thereon a computer program searching for information in an organization and displaying it on a screen, the computer program causing a computer to execute a process comprising:
- making a memory store correlation information showing correlation between information units including personnel in an organization and files stored in a network of the organization and feature information showing features of the information units;
- selecting information units with relevance to a search term based on the feature information if the search term is input;
- acquiring a degree of correlation among the selected information units based on the correlation information;
- generating display data displaying icons corresponding to the selected information units and connecting lines connecting these icons so that a display mode of a connecting line changes according to the degree of correlation;
- outputting the generated display data
- calculating a degree of relevance between an information unit and the search term based on the feature information and select an information unit with relevance with the search term based on the degree of relevance, and
- generating display data so that the information unit with a high degree of relevance is displayed by a relatively large icon.

* * * * *